United States Patent [19]
Hoxmeier et al.

[11] Patent Number: 5,773,521
[45] Date of Patent: Jun. 30, 1998

[54] COUPLING TO PRODUCE INSIDE-OUT STAR POLYMERS WITH EXPANDED CORES

[75] Inventors: Ronald James Hoxmeier; Arthur R. Bean, Jr., both of Houston, Tex.

[73] Assignee: Shell Oil Company, Houston, Tex.

[21] Appl. No.: 574,795

[22] Filed: Dec. 19, 1995

[51] Int. Cl.$^6$ .................................................. C08F 297/04
[52] U.S. Cl. ........................... 525/316; 525/314; 525/271
[58] Field of Search ................................... 525/316, 314, 525/271

[56] References Cited

U.S. PATENT DOCUMENTS

| | | |
|---|---|---|
| 3,210,333 | 10/1965 | Strobel . |
| 3,855,189 | 12/1974 | Farrar et al. . |
| 3,949,020 | 4/1976 | Prudence . |
| 3,975,339 | 8/1976 | Burchard et al. . |
| 3,985,830 | 10/1976 | Fetters et al. . |
| 4,010,226 | 3/1977 | Crossland ................................ 525/271 |
| 4,224,429 | 9/1980 | Lehn et al. . |
| 4,304,886 | 12/1981 | Bean, Jr. et al. . |
| 4,678,837 | 7/1987 | Mancinelli .............................. 525/250 |
| 4,822,530 | 4/1989 | Bronstert et al. . |
| 4,970,254 | 11/1990 | Willis et al. . |
| 5,070,131 | 12/1991 | Rhodes .................................... 524/484 |
| 5,166,277 | 11/1992 | Goodwin et al. . |
| 5,247,026 | 9/1993 | Eriicson ................................ 525/331.9 |
| 5,276,095 | 1/1994 | Hoxmeier . |
| 5,276,100 | 1/1994 | Coolbaugh et al. ..................... 525/314 |
| 5,552,493 | 9/1996 | Spence et al. ........................... 525/314 |

FOREIGN PATENT DOCUMENTS

| | | |
|---|---|---|
| 840806 | 10/1976 | Belgium . |
| 002012 | 5/1979 | European Pat. Off. . |
| 0312928 | 4/1989 | European Pat. Off. . |
| 2427955 | 1/1976 | Germany . |

*Primary Examiner*—Irina S. Zemel

[57] ABSTRACT

In the production of "inside-out" star polymers where a first polymer lithium chain is formed, coupled and thereafter additional monomer is introduced to produce the "out" polymer chains, improved control over the second polymerization is obtained by coupling with a mixture of a monoalkenyl-substituted aromatic compound and a polyalkenyl-substituted aromatic compound. For example, a mixture of divinylbenzene and styrene can be used. In another embodiment, an ether is introduced after completion of the first polymer chain formation. The presence of the ether also improves the second stage chain formation. Utilization of both the mixed coupling agents and the ether, preferably a diether such as 1,2-diethoxyethane gives the greatest control over the uniformity of the second stage polymerization, making possible the production of narrower molecular weight distribution polymer having no indication of bimodal distribution. The narrow molecular weight distribution is advantageous in many applications.

14 Claims, 2 Drawing Sheets

COUPLING TO PRODUCE INSIDE-OUT STAR POLYMERS WITH EXPANDED CORES

BACKGROUND OF THE INVENTION

This invention relates to star polymers.

The anionic polymerization of diene and/or vinylarene monomers by means of an organolithium initiator has long been known. Also known is the fact that in the absence of chain transfer agents, the resulting lithium terminated polymer chains simply stop growing when the monomer supply is exhausted, but remain capable of further reaction. Hence, such species are referred to as living polymers. That is, on addition of more monomer, polymerization restarts. By introducing a different monomer after the first monomer is exhausted, a block polymer can be produced. It is known to ultimately terminate the reaction either by introducing a chain termination component or by introducing a coupling agent to join two or more living polymer chains together. If a coupling agent having three or more active sites is used, a star or radial polymer can be produced. Even then the composition may contain living segments in the crosslinked core which are conventionally terminated by the deliberate addition of a chain transfer agent such as water or alcohol.

Coupling agents can be either simple difunctional agents which join two chains to give a linear polymer or polyfunctional agents such as silicon tetrachloride which give a star or radial polymer configuration. It is well known that one route to a polyfunctional coupling agent is to utilize a compound having two separately polymerizable vinyl groups such as divinylbenzene (DVB) which will polymerize in-situ to form a polyfunctional coupling agent.

In some instances the presence of active polymer lithium end groups in the core resulting from crosslinking are utilized as sites for further polymerization. In this operation, additional monomers are introduced and living polymer chains grow out from the central core, hence the term "inside-out" star polymers. However, while ordinary lithium initiated polymerizations with conjugated alkadienes or monoalkenyl aromatic compounds proceed with extraordinary uniformity and predictability in the absence of contaminants such as oxygen or water which act as chain transfer agents, the living polymer-lithium sites in the core of a coupled polymer act differently when it is desired to polymerize additional conjugated alkadiene or alkenyl aromatic compound. As a result, the initiation proceeds slowly and unevenly with the result that some relatively long polymer chains are produced. Furthermore, different cores react differently, thus giving molecules of varying molecular weight which can be undesirable.

SUMMARY OF THE INVENTION

It is an object of this invention to accelerate the speed of initiation of the final polymerization in an inside-out conjugated alkadiene and/or monoalkenyl aromatic compound polymer synthesis;

It is a further object of this invention to produce inside-out conjugated alkadiene and/or monoalkenyl aromatic compound polymers with controlled molecular weight distribution (i.e., monodisperse); and It is yet a further object of this invention to avoid broad molecular weight distribution in the production of conjugated alkadiene and/or monoalkenyl aromatic compound inside-out polymers; and it is still yet another object of this invention to produce an inside-out polymer of conjugated alkadienes and/or monoalkenyl aromatic compounds having a copolymerized core.

In accordance with one embodiment of this invention a mixture of a monoalkenyl substituted aromatic compound and a polyalkenyl substituted aromatic compound is used as the coupling agent to produce an initial star polymer followed by polymerization of a monomer selected from the group consisting of conjugated alkadienes, monoalkenyl aromatic compounds and mixtures thereof.

In accordance with another embodiment of this invention, an ether or amine promoter is added after the initial polymerization to facilitate subsequent initiation of a monomer selected from the group consisting of conjugated alkadienes, monoalkenyl aromatic compounds and mixtures thereof to form a polymer chain from the central crosslinked core of a star polymer.

In accordance with another embodiment of this invention, both the mixed monomer coupling agent and the ether or amine addition are utilized.

BRIEF DESCRIPTION OF THE DRAWINGS

In the drawings, forming a part hereof.

DETAILED DESCRIPTION OF THE INVENTION

Figure 1:
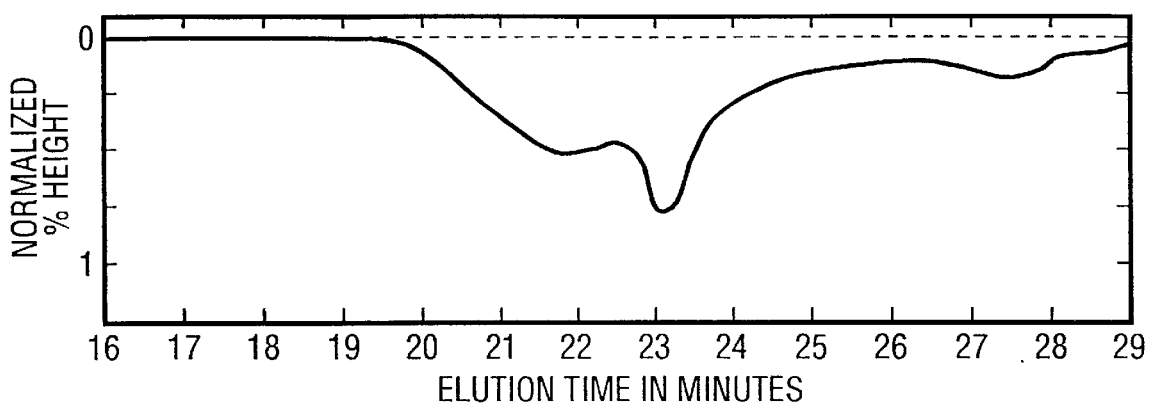
FIG. 1 is a GPC curve for a control polymer made using commercial DVB to form a coupling agent.
Figure 2:
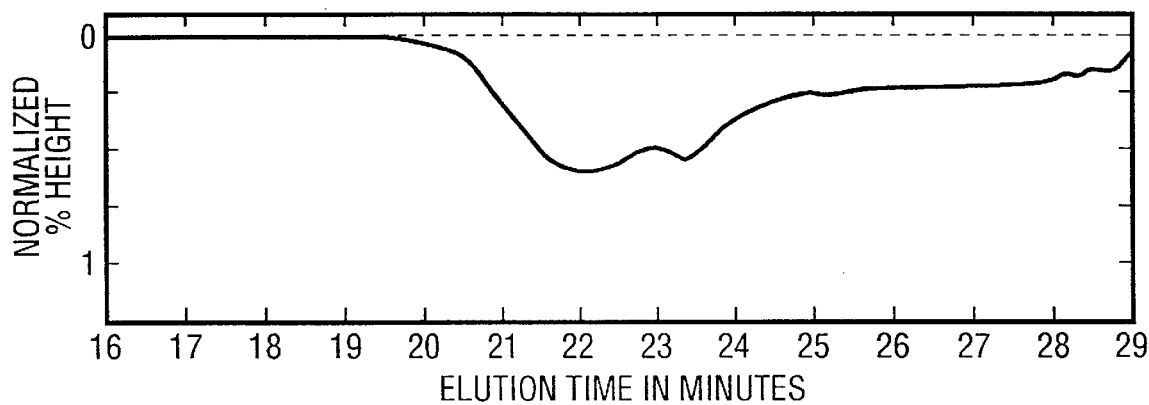
FIG. 2 is a GPC curve for a polymer made using a styrene/DVB mixture to produce the coupling agent.
Figure 3:
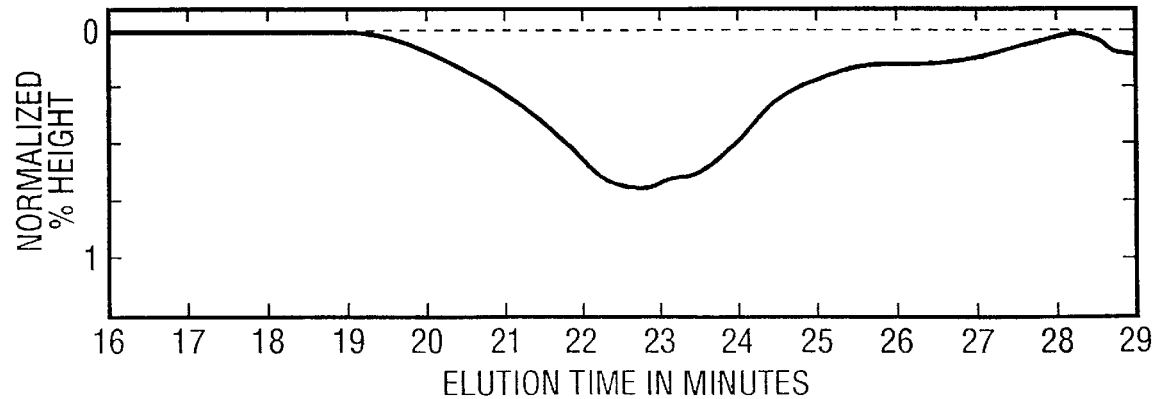
FIG. 3 is a GPC curve for a polymer made using an ether (dioxo) during polymerization of the "out" chains (Dioxo is 1,2-diethoxyethane).
Figure 4:
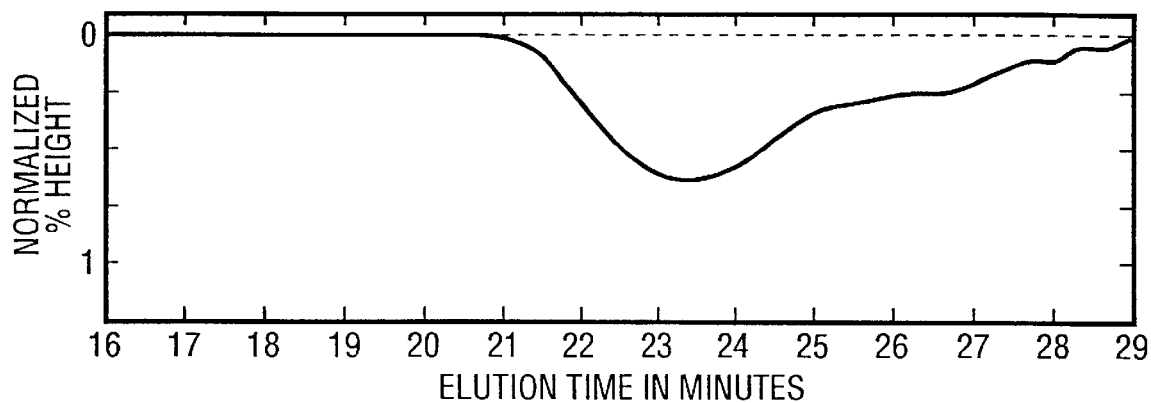
FIG. 4 is a GPC curve for a polymer made using a styrene/DVB mixture plus 100 ppm dioxo.
Figure 5:
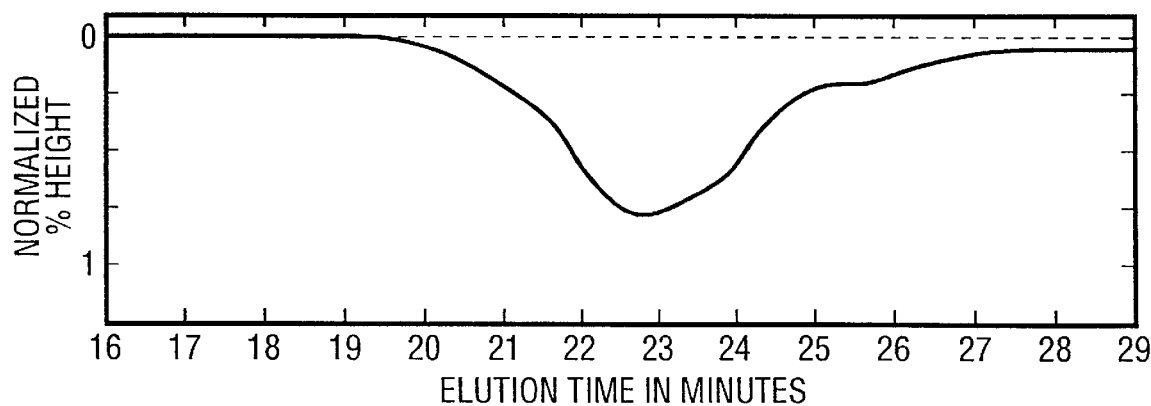
FIG. 5 is a GPC curve for a polymer made using a styrene/DVB mixture and 500 ppm dioxo.

It has been found that by producing a multifunctional coupling agent through the utilization of a mixture of a conventional polyalkenyl aromatic component such as divinylbenzene and a monoalkenyl component such as styrene, the resulting coupled polymer is more susceptible to the formation of "out" polymer chains on the introduction of additional conjugated diene and/or monoalkenyl aromatic compound monomer. It has further been found that the addition of an ether or amine at this stage with such monomer systems facilitates the formation of the "out" polymer chains.

Suitable monomers for the initial polymerization, i.e. the formation of the "inside" polymer chains are conjugated alkadienes and monoalkenyl aromatic hydrocarbons. The conjugated alkadienes preferably have 4 to 8 carbon atoms. Illustrative of such conjugated alkadienes are 1,3-butadiene (butadiene), 2-methyl-1,3-butadiene (isoprene), 1-3-pentadiene (piperylene), 1,3-octadiene, and 2-methyl-1,3-pentadiene. Preferred conjugated alkadienes are butadiene and isoprene. The preferred monoalkenyl aromatic compounds have 8 to 20 carbon atoms with alkenyl groups of up to 3 carbon atoms attached to a benzene ring as exemplified by styrene and styrene homologs such as ethyl vinyl benzene, α-methylstyrene and para-methylstyrene. Styrene and α-methylstyrene are particularly preferred monoalkenyl aromatic compounds, especially styrene.

Mixtures of the above described monomers can be utilized. One particularly suitable mixture is a mixture of a conjugated alkadiene such as butadiene or isoprene with a monoalkenyl aromatic compound such as styrene. It is preferred to utilize either all conjugated alkadiene or a mixture of conjugated alkadiene and monoalkenyl aromatic compound wherein the conjugated diene is present in an amount sufficient that the polymer chain produced would be viewed as elastomeric as opposed to resinous. For instance, mixtures of 60–99 wt % conjugated alkadiene and 1–40 wt % monoalkenyl aromatic compound are particularly suitable when mixtures are to be used. Again the preferred examples of this would be butadiene and styrene or isoprene and styrene. Alternatively, the monomer can be added sequentially to produce a block copolymer such as a styrene/butadiene block copolymer with either the polymerized styrene or polymerized butadiene as the endblock.

The organolithium initiator systems used in the first step of this invention to produce the inside polymer chains are those conventionally used in the art. They have the general formula RLi where R is a hydrocarbyl radical of 1 to about 20 carbon atoms. Examples of such lithium initiators are methyllithium, isopropyllithium, n-butyllithium, secbutyllithium, t-butyllithium, n-dodecyllithium, n-eicosyllithium, phenyllithium, naphthyllithium, p-tolyllithium, 4-phenylbutyllithium, cyclohexyllithium, and 4-cyclohexyllithium. Preferred are n-butyllithium and sec-butyllithium. The amount of the lithium metal initiator employed depends upon the desired properties of the polymer, particularly the desired molecular weight. Normally, the organomonollithium initiator is employed in the range of about 0.1 to 100 grain millimoles per 100 grams of total monomers.

The polymerization reaction is carried out in the presence of a hydrocarbon diluent. Preferably the hydrocarbon diluent is a paraffinic, cycloparaffinic or aromatic hydrocarbon having 4–10 carbon atoms or a mixture of such diluents. Examples for the diluent are n-hexane, n-heptane, 2,2-4-trimethylpentane, cyclohexane, benzene and toluene. Cyclohexane is generally the preferred solvent. The reaction is generally carried out with a weight ratio of diluent to monomers exceeding 1. Preferably the diluent is employed in a quantity between about 4 to about 20 parts by weight per 1 part by weight of total monomers.

The polymerization reaction in step 1 usually occurs within a period of time ranging from 1 minute up to about 6 hours. Preferably, the reaction is carried out within a time period of about 10 minutes to about 2 hours. The polymerization temperature is not critical and will generally be in a range of from about 15° to about 150° C., preferably in a range of about 40° to about 90° C. If the polymerization is carried out at a temperature above the boiling point of the reaction mixture, then reflux and/or elevated pressure can be used to maintain liquid conditions in the reaction medium.

At the conclusion of the initial polymerization in order to carry out the second or coupling step, the polymerization mixture is combined with the coupling agent.

Various materials are known to be detrimental to the lithium metal-initiated polymerization. Particularly, the presence of carbon dioxide, oxygen, water and alcohols should be avoided during an organomonolithium-initiated polymerization reaction of step 1 of this process as well as during the coupling and subsequent polymerization of the "out" polymer chains. Therefore, it is generally preferred that the reactants, initiators and the equipment be free of these materials and that the reaction is carried out under an inert gas such as nitrogen.

Coupling is effected in one embodiment of this invention by a mixture of monomers which produce a polyfunctional coupling agent in-situ. One component of this mixture is a polyalkenyl aromatic compound having at least two alkenyl groups of up to 3 carbon atoms attached to a benzene ring as exemplified by divinylbenzene and diisopropenyl benzene.

The other component of this mixture is a monoalkenyl aromatic compound of the same scope as those described hereinabove as monomers with styrene, α-methylstyrene and para-methylstyrene being preferred.

It is essential that the monomers utilized to produce the coupling agent in-situ be those as set out hereinabove. Other conventional coupling agents such as carbon monoxide, diesters, phenylbenzoate, phosphines, and silicon halides, would act as chain termination agents and thus are not suitable. While not wishing to be bound by theory, it is believed the key to this invention is production of a larger and more lightly crosslinked core for the inside-out star polymers. This equalizes rates of re-initiation for all the Li sites for the out arms and for polymerization of the out arms as well (easier diffusion of 'out' monomers to reaction sites in both cases).

The total amount of the coupling monomer mixture for producing the coupling agent in-situ can be that which will give the amount of the polyalkenyl aromatic compound conventionally utilized when divinylbenzene is used alone to produce a coupling agent in-situ. Thus the total amount of the mixture can vary from just slightly more than that conventionally used (when the ratio of the monoalkenyl:polyalkenyl compounds is low) to an amount substantially higher when the ratio is high. Generally this will be that which gives from 0.2:1 to 25:1, preferably 2:1 to 4:1, more preferably about 3:1 moles polyalkenyl aromatic compound: moles of lithium.

The ratio of monoalkenyl aromatic compound to polyalkenyl aromatic compound in the mixture used to produce the coupling agent can vary from 1:1 to 25:1, preferably 1:1 to 10:1, more preferably 2:1 to 8:1, most preferably 4:1 based on moles.

In an alternative embodiment of the invention, the coupling agent can be formed in a conventional manner utilizing only the polyalkenyl aromatic compound such as divinylbenzene (i.e. it must still be one that does not act or a chain termination agent). In this embodiment, an ether or amine, preferably a chelating ether or amine, is utilized after the initial polymerization. By chelating ether is meant an ether having more than one oxygen as exemplified by the formula R'O—R"O—R' where each R' is individually selected from 1 to 8, preferably 2 to 3 carbon atom alkyl radicals and R" is a 1 to 6, preferably 2 to 3 carbon atom alkylene radical. Examples of preferred ethers include 1,2-diethoxyethane and 1,2-dimethoxyethane. Ortho-dimethoxybenzene is also preferred. By chelating amine is meant an amine having more than one N such as N,N,N',N'-tetramethylethylene diamine as opposed to a mono-amine such as triethylamine. The monoamines are operable but less preferred. Less preferred also are straight chain and cyclic monoethers such dimethylether, diethylether, anisole, and tetrahydrofuran. It is believed the chelating ethers and amines enhance further the equalization of rates of re-initiation and polymerization of the out arms caused by the mixed monomer coupling agent.

Time, temperature and other process conditions for the coupling step can be within the scope of the parameters set out for the stage 1 polymerization.

Polar materials including the ethers described hereinabove are conventionally used in lithium-initiated polymerizations to control reaction rate and microstructure. However, it has been found necessary to add additional ether during or after the coupling step to bring about the maximum advantages of this invention even if an ether was used during the initial polymerization. Further, it has been found that the chelating ethers or amines are significantly more effective than the other ethers or amines.

The ethers or amines employed during or after the coupling step are generally employed in an amount within the range of 10 parts per million to 10% by weight based on the weight of the total polymer cement. Preferably, they are employed within the range of 50 to 1,000 parts per million, most preferably within the range of 100 to 750 parts per million. By total weight of polymer cement is meant the entire reactor contents including solvent and polymer.

As noted hereinabove, it is essential in this alternative embodiment of the invention to add the ether or amine during or after the coupling step, i.e. after the first polymerization to form polymer-Li chains. This means if ether or amine was used during the initial polymerization then additional ether or amine is added. This additional ether or amine can either be added along with the coupling agent or it can be added after the coupling is completed, either along with the monomer for the "out" polymer chains or just before or after the addition of the monomer for the "out" polymer chains. Preferably it is added after the coupling, most preferably with the second monomer.

The monomers utilized to produce the coupling agent polymerize, forming a multifunctional core to which the lithium ends of the polymer-lithium chains from the "inside" polymerization are attached. Thus, there is a star or radial structure but since the coupling agent is not one which also deactivates the lithium, there are still active lithium sites in the core. At this point, additional conjugated alkadiene and/or monoalkenyl aromatic compound monomer is introduced to produce the "out" chains. Preferred monomers are styrene, butadiene, isoprene or mixtures thereof. As with the "in" chains, the chains can be homopolymer, random copolymer or block copolymer.

Time, temperature and other process conditions can be within the scope of the parameters set out for the stage 1 polymerization. Frequently the temperature and other process conditions will be the same or similar for the stage 1 polymerization, coupling and stage 2 polymerization.

After the final (stage 2) polymerization, the polymer is treated in a conventional manner. This means it can simply be terminated through the addition of a chain transfer agent such as carbon monoxide, oxygen, alcohol or other known terminating agents such as acetone or acetaldehyde to deactivate the lithium and allow recovery of the finished inside-out polymer. Optionally, a functional group can be incorporated onto the end of the polymer lithium chains. For instance, the polymer can be treated with ethylene oxide to give —OLi at the ends of the "out" polymer chains (and any unreacted active lithium in the core) thus terminating the reaction, followed by the addition of an alcohol to give OH terminal groups. Electrophiles such as isocyanates, halides, or halosilanes may be added to produce amides, halides or alkylsilane functionality at the end of the "out" polymer arms. Alternatively, the "out" polymer chains can be endcapped with materials such as 1-4-formylmethylbenzoate, 4-formylbenzocyclobutane, 5-dimethylamino-benzaldehyde or epoxy ketones. U.S. Pat. No. 5,166,277, the disclosure of which is hereby incorporated by reference, discloses termination with ethylene oxide.

Following the termination, formation of polyols, or end capping, the polymers produced in accordance to this invention can be visualized as having the following structure:

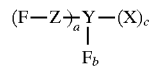

wherein a plus b equals c. The X represents the "in" chains. Y represents the core formed by the mixture of monomers which has coupled the initial polymer lithium chains. Z represents the "out" chains formed from the monomer polymerized after coupling. Polymer chains X and Z can be either homopolymer, random copolymer or block copolymer chains. In the case of block copolymer chains, any resinous block can be either attached to the Y or at the end of the chain and any elastomeric block can be either attached to the Y or at the end of the chain. F represents the entity introduced by the final termination or endcapping procedure. In the case of simple termination each F is hydrogen. Alternatively, each F can be individually selected from various endcapping functional groups. $F_b$ represents termination or endcapping of lithium atoms which did not participate in the "out" polymerization. Thus, a plus b equals c, i.e. the total number of initial, i.e. "in" polymer lithium chains is equal to the number of "out" chains plus the number of lithium sites which did not react further. Thus the value of "a" generally ranges from 1 to 100, more generally from 2 to 30. The value of "b" could be essentially 0, in which case there would be the same number of "in" chains as "out" chains. More generally, "b" will be from essentially 0 to a value equal to about 10 percent of c.

The amount of monomer utilized in the "in" polymerization relative to the amount of organo lithium initiator and the amount of monomer used in the "out" polymerization will determine the molecular weight. This can be varied to give values suitable for any particular end use. Generally, the molecular weight of the final polymer molecules will vary from about 500 to 2,000,000, with the molecular weight of each "in" block varying from about 500 to 100,000, preferably 1,000 to 50,000. Of course, for utilities such as coatings and adhesives a higher proportion of initiator is utilized and/or less monomer introduced for the "out" polymerization. Even liquid polymer can be produced, reflecting a molecular weight of arms generally within the range of 500 to 5,000. Higher molecular weights are utilized for utilities such as impact modifiers for resinous materials such as polystyrene, viscosity index improvers and elastomeric finished articles.

Molecular weights of linear polydienes are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodispersed and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good analytical method to use for a star polymer is to measure the weight average molecular weight by light scattering techniques. The sample is dissolved in a suitable solvent at a concentration less than 1.0 gram of sample per 100 millimeters of solvent and filtered using a syringe and porous membrane filters of less than 0.5 microns pore size directly onto the light scattering cell. The light scattering measurements are performed as a function of scattering angle and of polymer concentration using standard procedures. The differential refractive index (DRI) of the sample is measured at the same wavelength and in the same solvent used for the light scattering. Thus, the reference to molecular weight in reference to the polymers used in accordance with this invention approximates weight average molecular weight.

The 1,2-addition of 1,3-butadiene polymers influences the viscosity of the polymers. A 1,2-addition of about 40% is achieved during polymerization at 50° C. with about 6% by volume of diethylether or about 100 parts per million of glyme (1,2-diethoxyethane) based on total polymer cement.

The ratio of monomer used in the "in" polymerization and the "out" polymerization can vary greatly. Sometimes, it is preferred to utilize slightly less monomer in the "out" polymerization because when the "out" polymer chains extend beyond what might be viewed as the surface of a ball created by the "in" polymer chains, the polymer tends to thicken prior to termination and thus presents some processing difficulties. Also, if some of the lithium sites do not participate in the "out" polymerization, less monomer must be utilized just to get the "out" chains of the same length as the "in" chains. In this regard it is also within the scope of the invention to intentionally deactivate a portion of the lithium sites after coupling and before the "out" polymerization so as to have fewer "out" chains as compared with "in" chains. Thus, generally from 10 to 50%, preferably from 30 to 45 % of the polymer by weight is represented by the "out" chains. Again, this is subject to wide variation and it is not essential that the "out" chains be shorter than the "in" chains. Indeed in some instances, it is preferred to have 51–75% of the polymer be the "out" chains.

As previously noted, the preferred monomers are butadiene and/or isoprene. Hence the final product is generally an elastomer, assuming it has sufficient molecular weight to be a solid. It is within the scope of the invention to utilize an alkenyl substituted aromatic hydrocarbon in the "out" polymerization either as the sole monomer or as a comonomer with a diene or as the final monomer in a block polymerization of the final chains. Thus the production of a thermoplastic elastomer is possible as well as the production of material having sufficient alkenyl arene monomer content to be resinous.

By "elastomer" is meant a polymer which, when recovered and formed into an article, can be extended at least 60 %, and thereafter will recover at least 55% of the extension. That is, a 100 cm tensile specimen can be extended to 160 cm and, on release and stress, will return to no more than 127 cm in length.

Any of the polymers produced in accordance with this invention can be used as produced or can be hydrogenated to any extent desired in a manner known in the art. Hydrogenation of at least 90%, preferably at least 95% of any unsaturation in the polydiene blocks can be achieved with nickel catalysts as described in U.S. Pat. Nos. 27,145, and 4,970, 254, the disclosures which are incorporated herein by reference and in U.S. Pat. No. 5,166,277 referred to hereinbefore. The preferred nickel catalyst is a mixture of nickel 2-ethylhexanoate and triethylaluminum.

All of the polymers of this invention can have incorporated therein conventional ingredients such as antioxidants, U.V. stabilizers, agents to protect against ozone, fillers, pigments, other resins and, in the case of certain utilities such as adhesives, materials such as plasticizers, tackifiers, and solvents.

The final polymer product is separated from the reaction mixture by standard techniques, such as steam stripping or coagulation with a suitable non-solvent such as alcohol. The coagulated or stripped polymer can then be removed from the resulting medium by, e.g. centrifugation or extrusion. Residual solvent and other volatiles can be removed from the isolated polymer by heating, optionally under reduced pressure or in a forced air flow.

Example 1 (Control exp't) lowest sty/DVB ratio; no activator for 'out' arms 280 grams of cyclohexane was added to a weighted purged bottle. 4.4 grams of styrene was introduced into the bottle. This mixture was initiated with 0.8 ml of 1.4 molar sec-butyllithium solution in cyclohexane to give 1.1 mmoles of sec-butyllithium. The bottle was heated to 50° C. and held at that temperature for 30 minutes. At that point sufficient commercial divinylbenzene solution having a weight ratio of 0.6:1 ethylstyrene:divinylbenzene was introduced to give divinylbenzene:lithium mole ratio of 3:1. The solution became blood red and was heated for 30 minutes at 50° C. to allow the divinylbenzene/ethylstyrene mixture to copolymerize with the styryllithium arms to form a multifunctional coupling agent with coupled polystyrene-lithium chains. Thereafter, 10.6 grams of butadiene was added to produce the "out" arms. This was polymerized at 60° C. for 60 minutes, then the polymerization was terminated with 1 ml methanol.

Examples 2–5

The following four runs were made to determine the beneficial effects of sty/DVB mixed coupling agent systems, chelating ether utilized after the initial polymerization was completed, and a combination of the two. The procedures were carried out essentially as set out in Example 1. The composition of the five runs is shown herein below in Table I. The weight ratio of styrene to divinylbenzene in Examples 2, 4, and 5 was 4:1.

TABLE I

| Example No. | 1 | 2 | 3 | 4 | 5 |
|---|---|---|---|---|---|
| Cyclohexane | 280 | 280 | 280 | 280 | 236 |
| "in" monomer, g | 4.4 sty | 4.45 sty | 4.4 I | 4.4 I | 8.7 sty |
| sec buLi, ml[1] | 0.8 | 0.8 | 0.8 | 0.8 | 1.6 |
| Stage 1 time, min | 30 | 30 | 60 | 60 | 30 |
| Stage 1 temp, °C. | 50 | 50 | 50 | 50 | 50 |
| coupling agent STY/DVB ratio | DVB[2] 0.6 | STY/DVB 4 | DVB[2] 0.6 | STY/DVB 4 | STY/DVB 4 |
| coupling time, min | 30 | 30 | 60 | 60 | 30 |
| coupling temp, °C. | 50 | 50 | 50 | 50 | 50 |
| "out" monomer, g | 10.6 BD | 10.6 BD | 10.6 I | 10.6 I | 24.4 BD |
| Dioxo (ppm) | None | None | 100 | 100 | 500 |
| Stage 2 time, min | 60 | 60 | 60 | 60 | 60 |
| Stage 2 temp., °C. | 50 | 50 | 50 | 50 | 50 |

[1]1.4 molar solution in cyclohexane.
[2]Commercially available DVB contains a small amount of ethylstyrene.

In the above table, "STY" refers to styrene, "I" refers to isoprene, "DVB" refers to divinylbenzene and "BD" refers to butadiene and "Dioxo" refers to 1,2-diethoxyethane. The resulting polymers were submitted for GPC analysis and the results are shown in drawings 1 through 5, with drawing 1 corresponding to Ex. 1, drawing 2 corresponding to Ex. 2, drawing 3 corresponding to Ex. 3, and drawing 4 corresponding to Ex. 4 and drawing 5 corresponding to Ex. 5. As can be seen, all of the Runs were better than control Example 1, which depicts a conventional reaction in which neither a mixed monomer coupling agent nor a chelating ether was used. Both Ex. 2 which utilized the mixed monomer coupling agent but no chelating ether and Ex. 3 which utilized a chelating ether, but no mixed monomer coupling agent, showed less bimodal molecular weight distribution than control Ex. 1. Exs. 4 and 5 which used both the mixed monomer coupling agent and the chelating ether showed the best results with the very best results seen in Ex. 5 at 500 ppm Dioxo with no indication at all of bimodal distribution. It is noted that all of the runs including Ex. 1 and 3 used ordinary commercial divinylbenzene which would have had some small amount of ethylvinyl benzene impurity. As can be seen, any small amount of ethylvinyl benzene impurity in commercial divinylbenzene does not bring about the beneficial effect of the invention.

While this invention has been described in detail, for the purpose of illustration it is not to be construed as limited thereby, but is intended to cover all changes and modifications within the spirit and scope thereof.

What is claimed is:

1. A process comprising:
   a) introducing into a polymerization zone at least one polymerizable first monomer selected from the group consisting of conjugated alkadienes, monoalkenyl aromatic compounds and mixtures thereof under polymerization conditions employing an organolithium initiator;
   b) polymerizing said at least one polymerizable monomer with said organolithium initiator, thereby forming a first polymerization mixture;
   c) thereafter combining with said first polymerization mixture a mixture of at least one monoalkenyl aromatic compound and at least one polyalkenyl aromatic compound to produce a second polymerization mixture a molar ratio of said monoalkenyl aromatic compound to said polyalkenyl aromatic compound being about 4:1;
   d) thereafter combining at least one polymerizable second monomer selected from the group consisting of conjugated alkadienes, monoalkenyl aromatic compounds and mixtures thereof with said second polymerization mixture under polymerization conditions and polymerizing to give a polymer product.

2. A process acccording to claim 1 wherein said at least one polymerizable first monomer is selected from butadiene, isoprene, styrene and mixtures thereof, said polymerizable second monomer is selected from butadiene, isoprene, styrene and mixtures thereof, and wherein said organolithium initiator is selected from n-butyllithium and sec-butyllithium.

3. A process according to claim 1 wherein said at least one polymerizable first monomer is isoprene or butadiene followed by styrene to give a block copolymer chain.

4. A process according to claim 1 said at least one polymerizable first monomer is styrene followed by butadiene or isoprene to give a block copolymer chain.

5. A process according to claim 1 wherein said at least one polymerizable second monomer is styrene followed by butadiene or isoprene to give a block copolymer chain.

6. A process according to claim 1 wherein said polyalkenyl aromatic compound of (c) is divinylbenzene and said monoalkenyl aromatic compound of (c) is styrene.

7. A process according to claim 1 wherein said polymerizable second monomer is butadiene or isoprene followed by styrene to give a block copolymer chain.

8. A process according to claim 1 wherein said polymerizable first monomer is styrene and wherein said polymerizable second monomer is butadiene.

9. A process according to claim 1 wherein in addition, after step (c), a promoter comprising an ether or an amine, is added.

10. A process according to claim 9 wherein said promoter is added during step (d).

11. A process according to claim 9 wherein said promoter is a diether.

12. A process according to claim 1 wherein said monomer of (a) is styrene, said polyalkenyl aromatic compound of (c) is divinylbenzene, said monoalkenyl aromatic compound of (c) is styrene, said monomer of (d) is butadiene, and wherein 1,2-diethoxythane is combined with said coupled polymer mixture.

13. A process according to claim 1 wherein said process is carried out in cyclohexane, wherein said monomer of (a) is isoprene, said polyalkenyl aromatic compound of (c) is divinylbenzene, said monoalkenyl aromatic compound of (c) is styrene, said monomer of (d) is isoprene and wherein 100–750 ppm, based on the weight of said second monomer and said second polymerization mixture, of 1,2-diethoxyethane is introduced into said polymerization zone after said polymerizing of (b).

14. A process according to claim 1 wherein said process is carried out in cyclohexane and wherein said at least one polymerizable first monomer is isoprene, wherein said coupling agent is divinylbenzene, wherein said promoter is 1,2-diethoxyethene and wherein said polymerizable second monomer is isoprene.

* * * * *